United States Patent [19]

Kuder

[11] Patent Number: 5,089,304

[45] Date of Patent: Feb. 18, 1992

[54] METHOD FOR PRODUCING A CORROSION RESISTANT ARTICLE BY APPLYING A POLYBENZIMIDAZOLE COATING

[75] Inventor: James E. Kuder, Fanwood, N.J.

[73] Assignee: Hoechst Celanese Corp., Somerville, N.J.

[21] Appl. No.: 490,030

[22] Filed: Mar. 7, 1990

[51] Int. Cl.⁵ .............................................. B05D 3/02
[52] U.S. Cl. ............................... 427/388.1; 427/388.5; 427/435; 252/390; 252/394; 252/392
[58] Field of Search ................. 252/390, 394, 389.23, 252/392; 422/7; 427/388.1, 419.8, 388.5, 435; 106/14.05, 14.41, 14.42

[56] References Cited

U.S. PATENT DOCUMENTS

| | | | |
|---|---|---|---|
| Re. 26,065 | 7/1966 | Marvel | 260/47 |
| 3,168,417 | 9/1963 | Smith, Jr. et al. | 427/388.1 |
| 3,222,285 | 12/1965 | Rai et al. | 252/394 |
| 3,509,108 | 4/1970 | Prince | 260/78.4 |
| 3,642,720 | 2/1972 | Kray | 260/78.4 R |
| 3,708,439 | 11/1973 | Sayigh | 260/2 R |
| 3,933,531 | 1/1976 | Sawa et al. | 106/14.42 |
| 3,987,054 | 10/1976 | Butula | 252/390 |
| 4,000,079 | 12/1976 | Rasp et al. | 252/390 |
| 4,104,194 | 8/1978 | Botta et al. | 252/390 |
| 4,113,683 | 9/1978 | Kalnin et al. | 427/341 |
| 4,269,877 | 5/1981 | Shemensk, Sr. | 427/327 |
| 4,717,764 | 1/1988 | Ward | 528/377 |
| 4,759,986 | 7/1988 | Marikar et al. | 428/389 |
| 4,963,434 | 10/1990 | Chen, Sr. et al. | 427/378 |

FOREIGN PATENT DOCUMENTS 0236737  9/1987  European Pat. Off. ......... 427/388.1

OTHER PUBLICATIONS

Cotton and Scholes, British Corrosion Journal, vol. 2, pp. 1-5 (1967).
Eng and Ishida, Journal of Materials Science, vol. 21, pp. 1561-1568 (1986).

Primary Examiner—Michael Lusignan
Assistant Examiner—Diana L. Dudash
Attorney, Agent, or Firm—Joseph M. Mazzarese

[57] ABSTRACT

A method is provided for producing a corrosion resistant metallic article. The article to be protected is coated with a solution containing a polymeric composition drawn from the class of polymers commonly known as polybenzimidazoles, followed by drying or curing of the coated article. The coated metallic article resists corrosion under severe conditions. The coating adheres well, being non-peeling and resistant to organic solvents and heat.

17 Claims, 1 Drawing Sheet

METHOD FOR PRODUCING A CORROSION RESISTANT ARTICLE BY APPLYING A POLYBENZIMIDAZOLE COATING

TECHNICAL FIELD

The present invention relates to a method for rendering metallic articles resistant to corrosion by applying an adherent protective coating of certain polybenzimidazoles.

BACKGROUND

Extraordinary efforts are often required to protect metallic articles and metal-containing articles from corrosive environments or from deterioration over long periods of time in relatively mild atmospheres. Examples of metallic articles include structures such as bridges, objects of art, and high technology devices.

Numerous kinds of corrosion inhibitors have been developed, including organic and inorganic coatings and films as well as additives to the corrosive medium. Organic inhibitors are very often derived from heterocyclic compounds. For example, benzimidazoles in corrosive solutions inhibit corrosion of metals and alloys immersed in these solutions. Metals that are protected include iron, steel, copper, brass, nickel and zinc. As an example, U.S. Pat. No. 3,222,285 teaches that solutions containing laundry detergent and an additive that is either a bisbenzimidazolyl alkane or a bisbenzimidazolyl polyhydroxyalkane are non-corrosive to brass, even though the same laundry detergent alone in solution is corrosive. Of course, addition of a benzimidazole to the environment is usually not practical, as when the corrosive environment is the atmosphere or sea water.

According to a published report by Cotton and Scholes, *Brit. Corros. J.*, 2, pp. 1-5 (1967), monomeric benzimidazole is not effective as a corrosion inhibitor for copper in the form of a thin film because it is easily washed off of the copper by common organic solvents. Therefore, benzotriazole, films of which are not soluble, is commonly used as a film instead of benzimidazole for the prevention of corrosion of copper and brass.

Polymers can also be used as barrier coatings to protect metals from corrosion. The use of polymers with corrosion inhibiting functional groups for prevention of corrosion has also been described in the literature. For example, polyvinylimidazole, wherein the pendant imidazole moiety is an effective corrosion inhibitor, has been reported as useful for protection of copper at elevated temperatures (400° C.) by Eng and Ishida in *J. Mater. Science*, 21, pp. 1561-1568 (1986).

Polybenzimidazoles are well-known in the art for their resistance to high temperatures, oxidation, solvents, water, and conditions that induce corrosion of metals. Several patents relating to polybenzimidazoles (U.S. Pat. Nos. Re. 26,065; 3,509,108; 3,642,720 and 3,708,439) have indicated that one of the possible applications of polybenzimidazoles would be as protective films under corrosive conditions. One polybenzimidazole variant, poly-2,2'-(m-phenylene)-5,5'-bibenzimidazole, is commercially available from Hoechst Celanese Corporation and would therefore be exceptionally convenient. Polybenzimidazoles should make excellent protective coatings because of their stability coupled with the presence of protective benzimidazole groups, if an adherent coating can be applied to the metallic object. It is, however, well known in the art that polymer coatings on metals often do not adhere well and very often peel, which of course would leave the substrate unprotected.

SUMMARY OF THE INVENTION

It has been found, surprisingly, that the polybenzimidazoles of the present invention effectively adhere to copper-type substrates and are operative to prevent corrosion in even severe environments. There is hereinafter disclosed and claimed a method for producing a corrosion-resistant coated article including the steps of providing a corrodible metallic article selected from the group consisting of copper and alloys thereof, followed by coating of the article with a solution containing a polymeric composition having recurring units of the following formula:

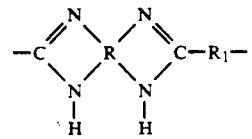

In the above formula, R is a tetravalent aromatic nucleus, with the nitrogen atoms forming the benzimidazole rings paired upon adjacent carbon atoms of the aromatic nucleus, and $R_1$ is selected from the group consisting of an aromatic ring, an alkylene group having from 4 to 8 carbon atoms, and a heterocyclic ring selected from the group consisting of pyridine, pyrazine, furan, quinoline, thiophene and pyran. The coating is bondably secured to the surface of the metallic article in such a way that it is non-peeling and operative to inhibit corrosion of said article.

The preferred polymeric composition in the present invention is poly-2,2'-(m-phenylene)-5,5'-bibenzimidazole, which is manufactured and sold by the assignee of this invention.

Any organic solvent that will dissolve the polymeric composition may be used for the present invention. Aliphatic, alicyclic, and aromatic amides are particularly good solvents for this class of polymers, with N,N-dimethylacetamide being most preferred. The concentration of the polymeric composition may be in the range of about 2% to 8%, the preferred concentration being about 5%. An inorganic salt may be added to the solution to enhance the solubility of the polymer. The salt can be present at a concentration of about 0.05% to 1%. In the preferred embodiment, the salt is LiCl at a concentration of about 0.5%. The step of bondably securing the coating to the metallic article includes drying the article at a temperature in the range of about 20° C.-250° C., more preferably in the range of about 100° C.-200° C., and most preferably at about 140° C.

BRIEF DESCRIPTION OF DRAWING

The invention is described in detail hereinafter with reference to the drawing, which illustrates the electrical current that flows through an unprotected copper strip when an oxidizing electrochemical potential is applied, and for comparison, the current that flows through a copper strip protected in accordance with the present invention under the same oxidizing conditions.

DETAILED DESCRIPTION OF THE INVENTION

Figure 1:
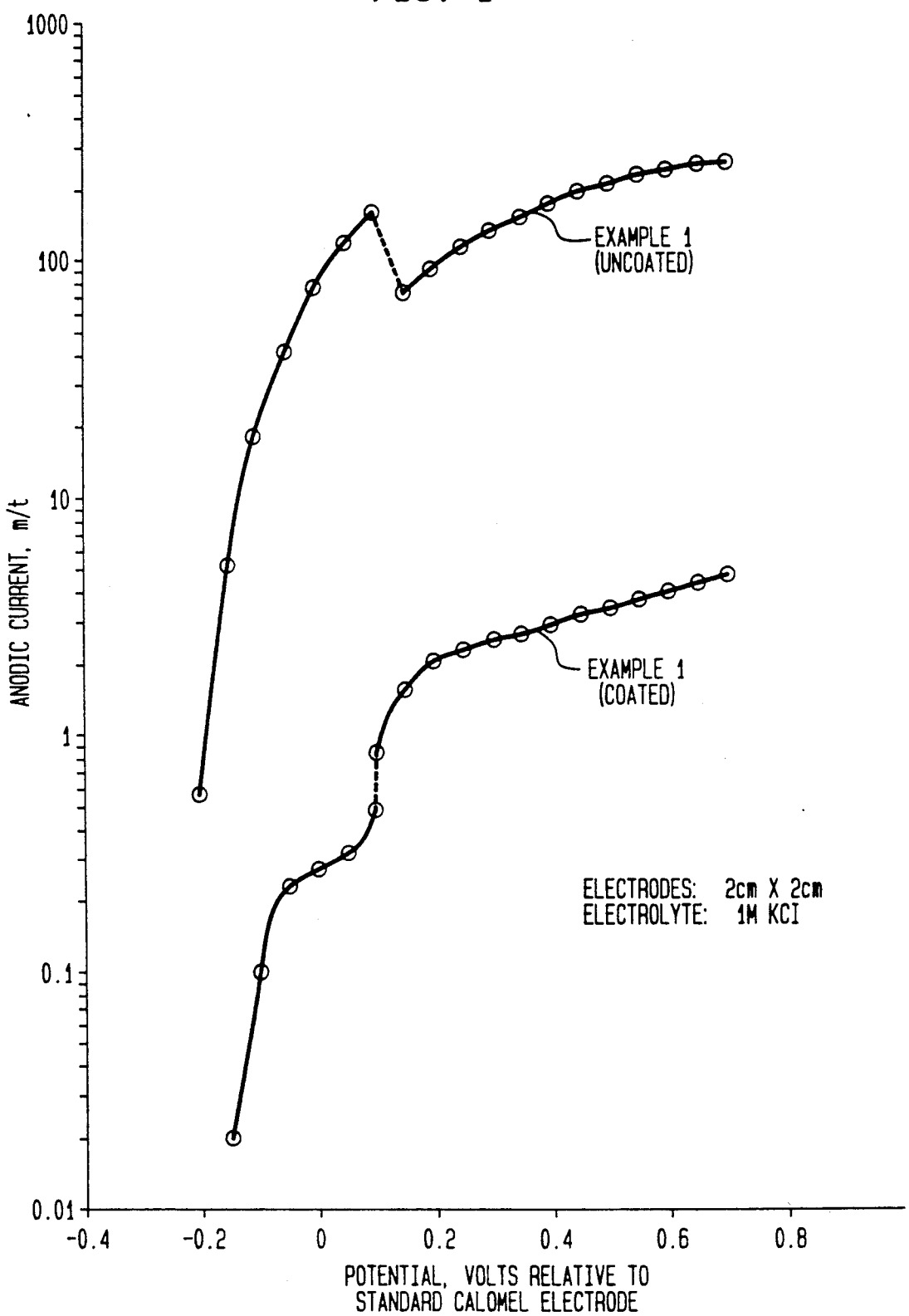

Described below is a method for producing a corrosion-resistant metallic article in accordance with the present invention by coating a corrodible metallic article with a solution containing a polymeric composition as described herein and then bondably securing the polymeric coating to the surface by drying or curing. As shown in Example 2 (comparative example), the polymeric composition does not adhere to copper substrates at high solution concentrations.

The polymeric composition is drawn from the class of polymers commonly referred to as polybenzimidazoles by those skilled in the art. Polybenzimidazoles of the present invention consist essentially of recurring units of the formula:

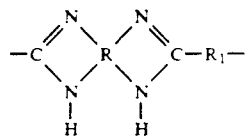

wherein R is a tetravalent aromatic nucleus, with the nitrogen atoms forming the benzimidazole rings paired upon adjacent carbon atoms of the aromatic nucleus, and $R_1$ is selected from the group consisting of an aromatic ring, an alkylene group having from 4 to 8 carbon atoms, and a heterocyclic ring selected from the group consisting of pyridine, pyrazine, furan, quinoline, thiophene and pyran. Polybenzimidazoles may be prepared by the condensation of an aromatic tetra-amine containing two pairs of orthodiamines with a dicarboxylic acid compound selected from the group consisting of (a) diphenyl esters of aromatic or aliphatic dicarboxylic acids; (b) diphenyl esters of heterocyclic dicarboxylic acids wherein the carboxyl groups are substituents upon a carbon in a ring selected from pyridine, pyrazine, furan, quinoline, thiophene and pyran; and (c) anhydrides of aromatic dicarboxylic acids. The aromatic nucleus of the aromatic tetra-amine may be a benzene ring, a fused aromatic ring, such as naphthalene, or two or more aromatic rings attached to one another by single bonds, such as biphenyl. The polymerization reaction is carried out according to methods well known in the art. Representative techniques for preparing polybenzimidazoles are disclosed in U.S. Pat. Nos. 3,509,108; 3,549,603; and 3,551,389, which are assigned to the assignee of the present invention and which are herein incorporated by reference.

The preferred polybenzimidazole composition for use in the present invention is poly-2,2'-(m-phenylene)-5,5'-bibenzimidazole, the recurring unit of which is:

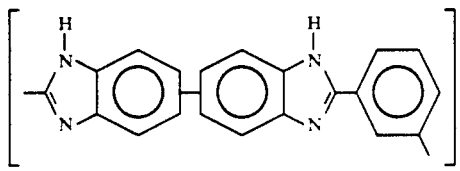

The abovementioned polybenzimidazole is manufactured by the assignee of the present invention and is readily available. This preferred polymeric composition may be obtained from Hoechst Celanese PBI Products Division, Box 32414, Charlotte, N.C. 28232.

The solvent for the present invention may be any organic solvent which will dissolve a polybenzimidazole composition. This includes, but is not limited to, aliphatic and alicyclic amides, such as, N,N-dimethylacetamide, N,N-dimethylformamide and N-methylpyrrolidinone; aliphatic and alicyclic esters, such as ethyl acetate and γ-butyrolactone; hexa-methylphosphoric triamide; aliphatic nitriles, such as acetonitrile and propionitrile; aliphatic and alicyclic sulfoxides and sulfones, such as dimethyl sulfoxide and tetramethylenesulfone; aliphatic, alicyclic, and aromatic ethers; and chlorinated hydrocarbons, such as dichloromethane, 1,1,1-trichloroethane, and 1,1,2,2-tetrachloroethane. In the preferred embodiment, using the preferred polybenzimidazole composition, the solvent of choice is N,N-dimethylacetamide. The concentration of the polybenzimidazole is critical in the successful use of the present invention and must be less than 10% to avoid poor adhesion and peeling, and is preferably in the range of about 2% to 8%, and more preferably is about 5%. In the preferred embodiment, using the preferred poly-2,2'-(m-phenylene)-5,5'-bibenzimidazole, the preferred solvent is N,N-dimethylacetamide.

Inorganic salts may also be added to the polybenzimidazole solution. Such salts enhance the solubility of the polybenzimidazole. These salts include, but are not limited to, inorganic salts selected from the halides of the Group IA metals of the periodic table; wherein the halides are fluoride, chloride, bromide and iodide; and wherein the Group IA metals are lithium, sodium, potassium, rubidium and cesium. An unexpected observation is that the presence of these salts in the coating solution does not have a deleterious effect on the corrosion resistant properties of the coated metallic article. The salt concentration may be in the range of about 0.05% to 1% by weight. In the preferred embodiment, the inorganic salt is lithium chloride at a concentration of about 0.5%.

In the present invention, the metallic article should be free of corrosion and oils. Exceptional preparation of the article is not necessary, however. The article should be sufficiently free of corrosion that it visually appears bright. The article should be washed with an organic solvent to remove oils and then dried prior to application of the coating. Any organic solvent can be used for removing oils, including aliphatic ketones, such as acetone; chlorinated solvents, such as dichloromethane or 1,1,1-trichloroethane; an alcohol, such as methanol or ethanol; aliphatic hydrocarbons, such as hexane or heptane; and aromatic hydrocarbons, such as benzene or toluene. The actual choice of solvent for removing oils will be affected by factors such as cost, ease of solvent removal by evaporation, environmental effects, and the contaminants that may be present on the metallic article.

The method of applying the polymeric composition in solution can be any of the several methods that are commonly used by those skilled in the art. These methods include, but are not limited to, dip coating, application with a brush, and spray coating. Evaporation of the solvent secures the polymeric composition to the article, provided that the solution concentration is within the range described herein. The temperature at which the solvent is evaporated can be from room temperature to about 250° C. For the preferred embodiment, in which poly-2,2'-(m-phenylene)-5,5'-bibenzimidazole in N,N-dimethylacetamide has been applied to the metallic article as a coating, the preferred temperature range is about 100° to 200° C., with the most preferred temperature being about 140° C.

The method for producing a corrosion resistant article using the present invention is illustrated in Example 1, along with data showing that the article resists corrosion. For comparison, Example 2 illustrates the importance of polymer concentration in this invention. It should be understood that the invention is not limited to the specific details set forth in Example 1.

EXAMPLE 1

A solution of about 20 wt. % poly-2,2'-(m-phenylene)-5,5'-bibenzimidazole and about 2 wt. % of LiCl in N,N-dimethylacetamide was diluted with N,N-dimethylacetamide to yield a solution with a concentration by weight of about 5% poly-2,2'-(m-phenylene)-5,5'-bibenzimidazole and about 0.5% LiCl. A bright strip of copper foil was rinsed with acetone and air dried. This strip was then dipped into the 5% polymer solution, air dried at ambient temperature for 5 minutes, and further dried in air at 140° C. for one hour. The thickness of the dried coating was estimated to be about 0.01 mm. After the drying procedure was completed, the portion of the copper strip that had not been immersed in the poly-2,2'-(m-phenylene)-5,5'-bibenzimidazole solution was dull red, whereas the coated portion remained bright red. The coated foil was then immersed in an aqueous 1M KCl solution in an electrochemical cell. The coating continued to adhere to the copper strip, and the color of the strip remained bright red. A positive (oxidizing) potential was applied to the coated copper strip. The current was measured over the range of about −0.2 volts to +0.7 volts relative to a standard calomel electrode. The electrical current passing through the electrode was measured as a function of voltage. The current increased as the voltage became more positive. However, over the whole range of applied voltages, the current was always about 2% of the current that was measured using an uncoated copper strip of the same size in the same apparatus. This is illustrated graphically in FIG. 1. FIG. 1 illustrates the current as a function of voltage for the coated copper strip and for an uncoated copper strip of equal size. The polymeric coating was preventing oxidation, even under the oxidizing conditions of Example 1, as shown by the low current in comparison with the unprotected copper strip. The difference in corrosion was also apparent by visual observation. The coated copper strip was still bright and unchanged in dimensions after the electrochemical experiment, whereas the uncoated copper strip was dull in appearance and had undergone obvious dissolution.

EXAMPLE 2 (COMPARATIVE)

The concentrated N,N-dimethylacetamide solution of 20% poly-2,2'-(m-phenylene)-5,5'-bibenzimidazole and 2% LiCl of Example 1 was diluted in half, yielding a 10% poly-2,2'-(m-phenylene)-5,5'-bibenzimidazole and 1% LiCl solution by weight. A copper strip was washed with acetone and air dried. This copper strip was then dipped into the 10% polymer/1% LiCl solution and dried first in air at ambient temperature for 5 minutes and then at 140° C. for one hour. The coated and dried copper strip was immersed in the same 1M KCl solution as in Example 1. In this experiment, the polymer coating peeled off of the copper strip before an oxidizing potential was applied. The coated copper strip was therefore not protected. This example illustrates the importance of the concentration of the polymeric composition in successfully using the present invention.

What is claimed is:

1. A method for producing a corrosion-resistant coated article comprising the steps of;
   a) providing a corrodible metallic article selected from the group consisting of copper and alloys thereof;
   b) coating said article with a solution containing a polymeric composition consisting essentially of recurring units of the formula:

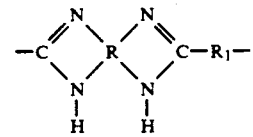

wherein R is a tetravalent aromatic nucleus, with the nitrogen atoms forming the benzimidazole rings paired upon adjacent carbon atoms of said aromatic nucleus, and $R_1$ is selected from the group consisting of an aromatic ring, an alkylene group having from 4 to 8 carbon atoms. and a heterocyclic ring selected from the group consisting of pyridine, pyrazine, furan, quinoline, thiophene and pyran; and
   c) bonding said polymeric composition to the surface of said metallic article, the polymeric coating being non-peeling and being operative to inhibit corrosion of said article.

2. The method of claim 1 wherein said solution comprises an aliphatic, aromatic, or alicyclic amide solvent.

3. The method of claim 2 wherein said solvent is N,N-dimethylacetamide.

4. The method of claim 1 wherein the concentration of said polymeric composition in said solution is about 2% to about 8% by weight.

5. The method of claim 1 wherein the concentration of said polymeric composition in said solution is about 5% by weight.

6. The method of claim 1 wherein said solution further comprises an inorganic salt.

7. The method of claim 6 wherein the concentration of said inorganic salt in said solution is about 0.05% to 1% by weight.

8. The method of claim 6 wherein the concentration of said inorganic salt is about 0.5% by weight.

9. The method of claim 6 wherein said inorganic salt is LiCl.

10. The method of claim 1, wherein said polymeric composition is poly-2,2'-(m-phenylene)-5,5'-bibenzimidazole.

11. The method of claim 1 wherein said solution consists essentially of poly-2,2'-(m-phenylene)-5,5'-bibenzimidazole, LiCl, and N,N-dimethylacetamide.

12. The method of claim 11 wherein the concentrations of said poly-2,2'-(m-phenylene)-5,5'-bibenzimidazole and said LiCl in said N,N-dimethylacetamide are about 2% to 8% and about 0.05% to 1% by weight respectively.

13. The method of claim 11 wherein the concentrations of said poly-2,2'-(m-phenylene)-5,5'-bibenzimidazole and said LiCl are about 5% and about 0.5% by weight respectively.

14. The method of claim 1 wherein said step of bondably securing said polymeric coating to said surface of said metallic article comprises drying at a temperature in the range of about 20° C. to 250° C.

15. The method of claim 14 wherein said temperature is about 100° C. to about 200° C.

16. The method of claim 14 wherein said temperature is about 140° C.

17. The method of claim 13 wherein said step of bondably securing said poly-2,2'-(m-phenylene)-5,5'-bibenzimidazole to said surface of said metallic article comprises drying at a temperature of about 140° C.

* * * * *

UNITED STATES PATENT AND TRADEMARK OFFICE
CERTIFICATE OF CORRECTION

PATENT NO. : 5,089,304
DATED : February 18, 1992
INVENTOR(S) : James E. Kuder

It is certified that error appears in the above-indentified patent and that said Letters Patent is hereby corrected as shown below:

In the Drawings, on Figure 1 at the wide coordinate which recites Current, "m/t" should read --mA --.

Signed and Sealed this

Fifteenth Day of June, 1993

Attest:

MICHAEL K. KIRK

Attesting Officer

Acting Commissioner of Patents and Trademarks